(12) United States Patent
Denton

(10) Patent No.: US 10,794,607 B2
(45) Date of Patent: Oct. 6, 2020

(54) CONFIGURING FLOW PATHS OF AN HVAC SYSTEM

(71) Applicant: Trane International Inc., Davidson, NC (US)

(72) Inventor: Darryl E. Denton, Tyler, TX (US)

(73) Assignee: Trane International Inc., Davidson, NC (US)

( * ) Notice: Subject to any disclaimer, the term of this patent is extended or adjusted under 35 U.S.C. 154(b) by 112 days.

(21) Appl. No.: 16/015,475

(22) Filed: Jun. 22, 2018

(65) Prior Publication Data

US 2019/0390865 A1 Dec. 26, 2019

(51) Int. Cl.
| | |
|---|---|
| *F24F 11/46* | (2018.01) |
| *G05B 15/02* | (2006.01) |
| *F24F 3/044* | (2006.01) |
| *F24F 11/58* | (2018.01) |
| *F24F 11/64* | (2018.01) |
| *F24F 11/65* | (2018.01) |
| *F24F 13/10* | (2006.01) |
| *F24F 11/72* | (2018.01) |
| *F24F 140/60* | (2018.01) |
| *F24F 120/12* | (2018.01) |
| *F24F 120/20* | (2018.01) |
| *F24F 140/40* | (2018.01) |
| *F24F 140/50* | (2018.01) |

(52) U.S. Cl.
CPC ............ *F24F 11/46* (2018.01); *F24F 3/0442* (2013.01); *F24F 11/58* (2018.01); *F24F 11/64* (2018.01); *F24F 11/65* (2018.01); *F24F 11/72* (2018.01); *F24F 13/10* (2013.01); *G05B 15/02* (2013.01); *F24F 2003/0446* (2013.01); *F24F 2120/12* (2018.01); *F24F 2120/20* (2018.01); *F24F 2140/40* (2018.01); *F24F 2140/50* (2018.01); *F24F 2140/60* (2018.01)

(58) Field of Classification Search
None
See application file for complete search history.

(56) References Cited

U.S. PATENT DOCUMENTS

| | | |
|---|---|---|
| 4,090,062 A | 5/1978 | Phillips et al. |
| 4,337,401 A | 6/1982 | Olson |

(Continued)

FOREIGN PATENT DOCUMENTS

| | | |
|---|---|---|
| WO | 2011/109759 A1 | 9/2011 |
| WO | 2016/073969 A1 | 5/2016 |

*Primary Examiner* — Jason Lin
(74) *Attorney, Agent, or Firm* — The Salerno Law Firm, P.C.

(57) ABSTRACT

Configuration of flow paths for the output (e.g., chilled or heated air) of an HVAC system is described. In one embodiment, a demand response message can be received from a resource provider requesting that the HVAC system increase or decrease consumption of the resource. If the request is satisfied, then the output from the HVAC device will be increased or decreased resulting in potential discomfort for occupants. This output, however, rather than being distributed in a uniform manner, can instead be distributed, via ventilation elements of the HVAC system in a non-uniform way according to the flow paths. The flow paths can be determined to direct sufficient output to high priority zones in order to, e.g., satisfy a comfort level in the high priority zones.

12 Claims, 10 Drawing Sheets

(56) References Cited

U.S. PATENT DOCUMENTS

| | | | |
|---|---|---|---|
| 7,249,043 B1* | 7/2007 | Trout, II | G06Q 10/06 |
| | | | 705/7.25 |
| 8,020,777 B2* | 9/2011 | Kates | F24D 19/1084 |
| | | | 165/208 |
| 8,410,633 B2 | 4/2013 | Batzler et al. | |
| 8,412,382 B2 | 4/2013 | Imes et al. | |
| 8,695,888 B2* | 4/2014 | Kates | G05D 23/1934 |
| | | | 236/49.3 |
| 8,755,943 B2 | 6/2014 | Wenzel | |
| 9,065,294 B2 | 6/2015 | Kambara et al. | |
| 9,337,943 B2 | 5/2016 | Mosebrook et al. | |
| 9,338,861 B2 | 5/2016 | Wang et al. | |
| 9,651,271 B2 | 5/2017 | Saffre et al. | |
| 9,838,255 B2 | 12/2017 | Imes et al. | |
| 9,864,391 B2 | 1/2018 | Lu et al. | |
| 2005/0096797 A1* | 5/2005 | Matsubara | H02J 3/00 |
| | | | 700/291 |
| 2009/0030555 A1* | 1/2009 | Gray | F24F 11/30 |
| | | | 700/277 |
| 2009/0096291 A1 | 4/2009 | Gainville et al. | |
| 2010/0082162 A1* | 4/2010 | Mundy | F24F 3/044 |
| | | | 700/277 |
| 2010/0102135 A1* | 4/2010 | Alles | F24F 3/044 |
| | | | 236/49.1 |
| 2011/0031322 A1* | 2/2011 | Zou | F24F 3/0442 |
| | | | 236/1 B |
| 2011/0090042 A1 | 4/2011 | Leonard et al. | |
| 2011/0184581 A1* | 7/2011 | Storch | G06Q 10/06 |
| | | | 700/295 |
| 2011/0218690 A1 | 9/2011 | O'Callaghan et al. | |
| 2015/0253027 A1 | 9/2015 | Lu et al. | |
| 2019/0353383 A1* | 11/2019 | McCune | F24F 11/54 |

\* cited by examiner

CONFIGURING FLOW PATHS OF AN HVAC SYSTEM

TECHNICAL FIELD

The present disclosure is directed to systems, apparatus, and methods for configuring flow paths of a heating, ventilation, and air conditioning (HVAC) system, and in particular, configuring flow paths that can reduce discomfort of occupants when modifying resource consumption of the HVAC system to satisfy a demand response request from the resource provider.

BACKGROUND

Due to variances in supply and demand, providers of electricity and other resources can provide demand response signals to customer devices (e.g., air conditioning units, heating units, or other HVAC devices). These demand response signals can include a request that customer devices modify the amount of electricity being consumed. For single stage devices, a request from the electricity provider to reduce consumption can be satisfied by turning the customer device off or changing the device's temperature setpoint. More modern customer devices have multiple stages, so instead of switching on/off, the device can operate at variable speed or variable power or some other setting. Operating at half-power, or another stage, can satisfy the provider's request by using less electricity without requiring the device to be shut off entirely.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to an embodiment of the present invention, a system can comprise a memory that stores computer executable components and a processor that executes computer executable components stored in the memory. The computer executable components can comprise an interface component that can receive demand response data from a resource provider. The demand response data can comprise a request that a resource consumption device of a heating, ventilation, or air conditioning (HVAC) system modify consumption of a resource according to a recommended value. The computer executable components can comprise a control component that can instruct the resource consumption device to update consumption of the resource from a previous value to the recommended value. Such can result in a change in the output of the of the resource consumption device. The computer executable components can further comprise a flow management component that can determine flow data indicative of a flow path of a ventilation system of the HVAC system, wherein the flow path is determined as a function of change data, zone data, and priority data. The change data can be representative of a change in output provided by the resource consumption device in response to changing consumption of the resource to the recommended value. The zone data can be representative of physical zones of a structure serviced by the HVAC system. The priority data can be representative of priority values assigned to respective physical zones of the structure.

In some embodiments, elements described in connection with the system can be embodied in different forms such as a computer-implemented method, a computer program product, or another form.

DETAILED DESCRIPTION

Overview

Figure 1:
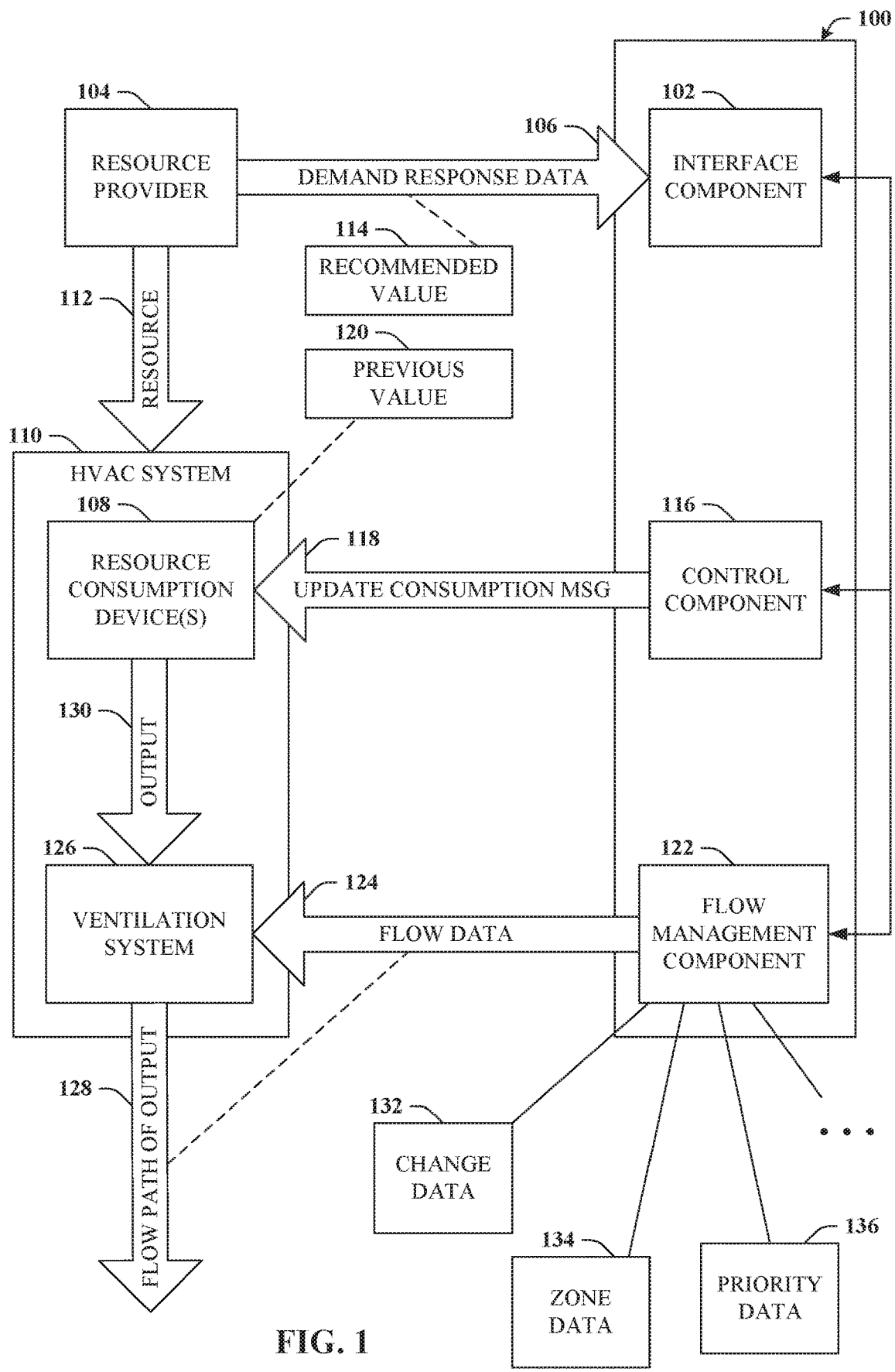
FIG. 1 illustrates a block diagram of an example, non-limiting system that can be configured to determine a flow path of resource consumption device output that reduces discomfort of occupants in the face of a demand response request from a resource provider in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Due in part to the proliferation of multistage resource consumption devices (e.g., air conditioner, heat pump, heater, etc.) of a heating, ventilation, and air conditioning (HVAC) system, demand response messages from providers of resources have evolved to make better use of the multistage devices. For example, when single stage devices were the target, demand response messages often simply requested that consumption of the resource be reduced, which could only be accomplished by powering down the single stage device for a period of time. However, for multistage devices, demand response messages can request that a resource consumption device reduce consumption of the resource by a specified amount (e.g., 10%, 25%, 50%, 80%, etc.).

Such was believed to represent a viable compromise between the provider requesting a reduction in demand for the resource and a level of comfort of the customer. For example, suppose a resource provider transmits a demand response request to customers, requesting that consumption be reduced by 50% on a hot, summer day in which energy demand is very high. A multistage air conditioner consuming the electricity at full potential can be switched to another stage that reduces the amount or rate of consumption by half or some other value. In that case, the resource provider is benefited by a reduction in demand of the resource and the resource customer can contribute to that reduction in demand without being forced to choose to either ignore the provider's request or go without any air conditioning at all.

In certain resource markets, resource providers can receive subsidies or other benefits from regulatory agencies if a high proportion of customers enroll in programs, such as demand response programs. Thus, by encouraging customers to enroll or opt-in to a demand response program, resource providers can be benefited in terms of both satisfying regulatory agency standards as well as increasing the effectiveness of demand response messages, since more customers enrolled in a demand response program can mean any request to modify resource consumption will be met with higher response rates.

Likewise, customers often receive incentives from resource providers to enroll in such programs, such as lower prices or other incentives. Even so, in the days of single stage devices, when the choice was ignore the request from the resource provider or turn off the air conditioner and suffer, program enrollment tended to be very low. More recently, with multistage devices being more common now and in the future, program enrollment has gradually improved. However, even with multistage devices, certain issues arise in previous systems.

For example, while it may be possible to satisfy a demand response request from the energy provider without going entirely without air conditioning, a multistage device operating at half-power may not be sufficient satisfy a particular thermostat set point or satisfy other customer comfort level expectations. For instance, a house or other structure set to 76 degrees may rise to 80 degrees when the associated air condition is consuming 50% of the maximum setting. Hence, everyone in the house is likely to have some discomfort, even if that discomfort is less than when shutting the air condition unit off.

The disclosed subject matter, in some embodiments, can mitigate these and other issues. For example, techniques disclosed herein can allow HVAC devices to make more efficient use of output provided by the air conditioning device or other resource consumption devices. For instance, it is unlikely that an air conditioning device operating at half-power can maintain the entire home or other building or structure at a desired temperature. However, the air conditioner operating at half-power might be capable of maintaining the desired temperature in some portions of the home, provided the output of the air condition (e.g., chilled air) is focused on the those portions instead of being distributed throughout the entire home.

Hence, in some embodiments, the disclosed subject matter can react to a demand response message from a resource provider by determining flow data. This flow data can be indicative of a flow path of the output of the resource consumption device. Specifically, the flow path can route a sufficient amount of the output to designated high priority zones in order to maintain a particularly level of comfort in those high priority zones. The remainder of the output from the resource consumption device, if any, can be routed to designated low priority zones.

Continuing the above example in which the air condition switches to a half-power mode based on a demand response message from the energy provider, the following can be observed. In other systems that do not employ the disclosed techniques, all occupants of the home are likely to experience some level of discomfort as the interior temperature increases in a relatively uniform way from the set point setting of 76 degrees to 80 degrees. In contrast, by employing the disclosed techniques, the high priority zones can be a function of occupancy. Thus, the zones or rooms of the home having occupants, which might be only a small fraction of the entire home, can likely be maintained at the comfort setting of 76 degrees. In that case, the customer might experience no discomfort at all and may not even notice his or her air conditioner is operating at a reduced load.

Such can be advantageous for several reasons. For instance, aside from the increased comfort available to the customer, the customer is much more likely to enroll in demand response programs offered by the resource provider since it is no longer necessary to sacrifice comfort in order to obtain cost savings or other incentives from the program.

For the sake of clarity, the description herein focuses on an air conditioning device that consumes electricity to produce chilled air output. However, it is understood that the disclosed subject matter can be applicable to any suitable resource consumption device (e.g., heater, boiler, air conditioner, heat pump, etc.) that consumes any suitable resource (e.g., water, air, gas, electricity, steam (WAGES), etc.) and/or that generates or conveys any suitable output, typically a fluid output (e.g., chilled air/water, heated air/water, steam, etc.) having a flow path through a ventilation system (e.g., ducts, pipes, etc.) that can be manipulated.

It is further noted that the disclosed subject matter is not limited to load shed requests from the resource provider. Rather, the disclosed subject matter can be exceedingly useful in connection with "load up" events, in which the resource provider requests that customers increase resource consumption. Load up events can occur when there is excess capacity that can arise due to, e.g., solar or wind-powered grids, or other sources or events. When there is excess capacity, the resource provider may attempt to use that excess capacity while it available in order to reduce demand at a later time, such as a time when no excess capacity exists. In that regard, in warmer seasons or climates, an air conditioner might be instructed to switch on and operate at full power, even though the temperature of the home is presently at or below a desired set point. Likewise, in cooler seasons or climates, a heater might be instructed to switch on and operate at full power, even though the temperature of the home is presently at or above a desired set point. Thus, the heater heating the home operates as a thermal battery, just as the air conditioner chilling the home operates as a thermal sink. In either case, such can introduce a longer delay before a thermostat triggers further heating or cooling.

In other words, by further raising the temperature of the home, the home can operate as a thermal battery/storage. By further lowering the temperature of the home, the home can operate as a thermal sink/drain. For energy efficient homes, overheating or overcooling a home at times of excess capacity can significantly reduce expected near-term future use of the resource, which may coincide with or overlap a peak load period.

Unfortunately, load up events can also cause occupants of the home to experience discomfort. However, such can be remedied by the disclosed subject matter in a similar manner. For example, the output of the resource consumption device can be manipulated such that high priority zones can be maintained at a temperature consistent with a comfort setting, and low priority zones receive the excess, which may result in a larger temperature differential between the high priority zones and the low priority zones.

Example Systems

Referring now to the drawings, FIG. 1 illustrates a block diagram of an example, non-limiting system 100. System 100 can be configured to determine a flow path of resource consumption device output that reduces discomfort of occupants in the face of a demand response request from a resource provider in accordance with one or more embodiments of the disclosed subject matter. System 100 can comprise a processor and a memory that stores executable instructions that, when executed by the processor, facilitate performance of operations. Examples of said processor and memory, as well as other suitable computer or computing-based elements, can be found with reference to FIG. 10, and can be used in connection with implementing one or more of the systems or components shown and described in connection with FIG. 1 or other figures disclosed herein.

In this example, system 100 can include interface component 102, control component 116, and flow management component 122, which are further detailed below. Interface component 102 can be configured to communicate signals or messages to or from resource provider 104. For instance, interface component 104 can receive demand response data 106, which can comprise a request that one or more resource consumption device 108 modify consumption of resource 112 according to a recommended value 114. For instance, recommended value 114 can indicate that resource consumption device 108 is to reduce consumption of resource 112 by some percentage (e.g., 30%, 50%, 75%, etc.) of full capacity. As illustrated, resource consumption device 108 can be a component of heating, ventilation, and air conditioning (HVAC) system 110. In some embodiments, resource consumption device 108 can be a variable speed device and/or a dual-stage or multistage device.

Control component 116 can be configured to instruct resource consumption device 108 to update consumption of resource 112, which is illustrated by update consumption message 118. For instance, control component 116 can instruct resource consumption device 108 to update consumption of resource 112 from previous value 120 (e.g., a value associated with a setting prior to receiving demand response data 106 and/or prior to an update consumption message 118 iteration). It is appreciated that control component 116 can update or modify recommended value 114 to map recommended value 114 to a setting determined to be supported by resource consumption device 108.

Flow management component 122 can be configured to determine flow data 124, which can be provided to ventilation system 126 (e.g., a controller of ventilation system 126) and/or to a controller of HVAC system 110. Flow data 124 can be indicative of a flow path 128 of ventilation system 126. For example, output 130 from resource consumption device 108 is received by ventilation system 126. In other systems, similar output is distributed relatively uniformly throughout a home. In contrast, however, in some embodiments, ventilation system 126 can distribute output 130 in a non-uniform way according to flow path 128, which is further detailed in connection with FIG. 5, infra.

Flow data 124, which can describe flow path 128, can be determined by flow management component 122 based on, or as a function of, change data 132, zone data 134, priority data 136, or other suitable data (e.g., weather forecasts, thermodynamics, etc.). Change data 132 can be representative of a change in output 130 provided by the resource consumption device 108 in response to changing consumption of resource 112 from previous value 120 to recommended value 114. Additional detail relating to change data 132 can be found with reference to FIG. 2.

Zone data 134 can be representative of physical zones of a structure serviced by HVAC system 110. The structure can be, e.g., home/house, office, or other building or any suitable space operatively coupled to ventilation system 126. An illustration of a suitable structure and additional detail regarding zone data 134 is further detailed with reference to FIG. 3.

Priority data 136 can be representative of priority values assigned to respective physical zones of the structure. Additional detail relating to priority data 136 can be found in connection with FIG. 4.

Figure 2:
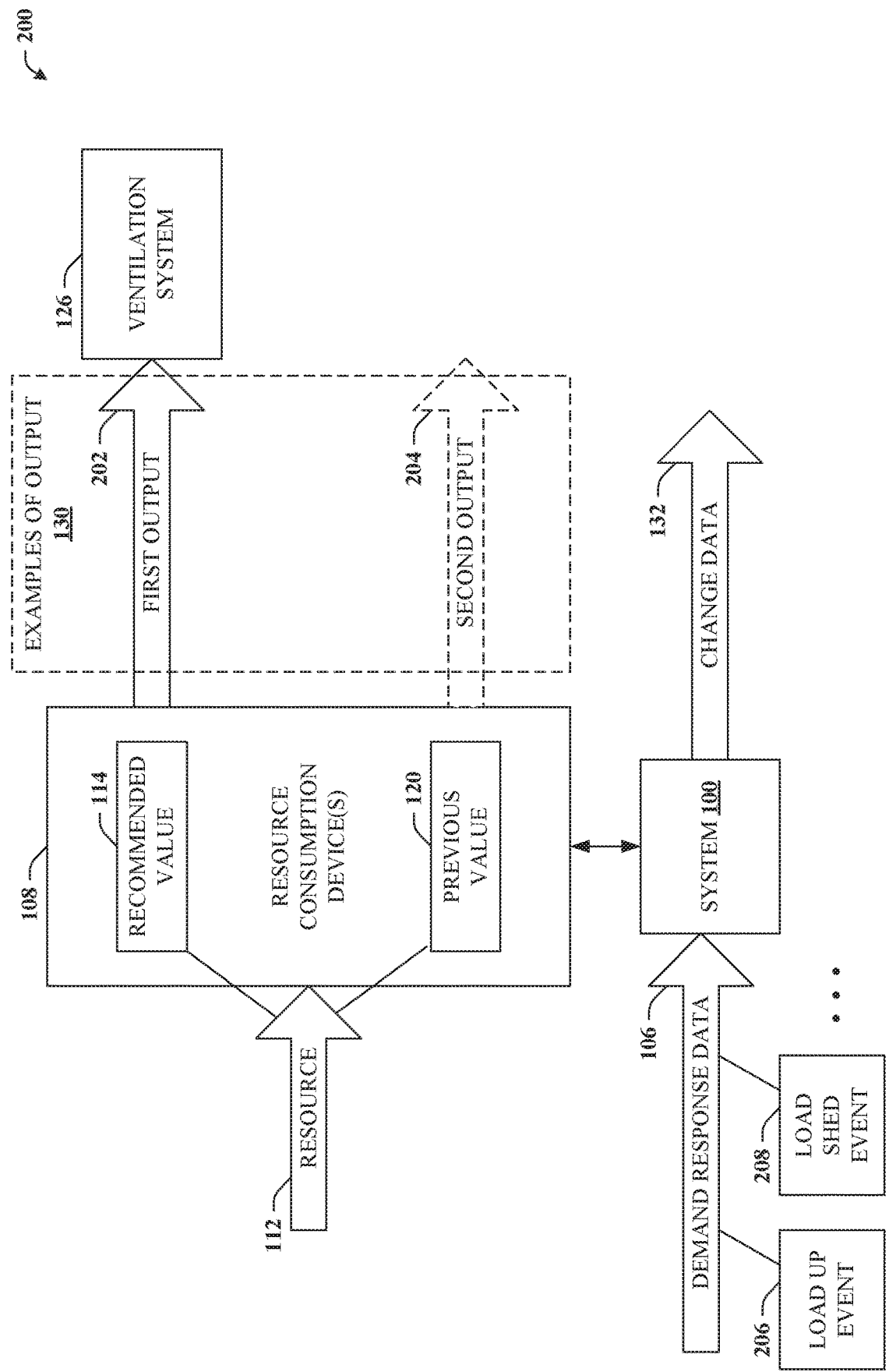
FIG. 2 illustrates a block diagram of an example system depicting additional aspects or elements in connection with determining or inferring change data in accordance with one or more embodiments of the disclosed subject matter.

While still referring to FIG. 1, but turning now as well to FIG. 2, a block diagram of system 200 is depicted. System 200 illustrates additional aspects or elements in connection with determining or inferring change data 132 in accordance with one or more embodiments of the disclosed subject matter. It should be understood that in the discussion of the present embodiment and of embodiments to follow, repetitive description of like elements employed in the various embodiments described herein is omitted for sake of brevity.

System 200 can include all or a portion of system 100, as well as any other suitable component or element detailed herein. As illustrated, resource consumption device 108 consumes resource 112 and in response generates output 130. Upon receipt of demand response data 106, system 100 (e.g., control component 116) can facilitate the update of resource consumption device 108 to consume a different amount of resource 112. Consuming a different amount of resource 112 can affect output 130. Typically, reducing consumption of resource 112 results in a reduced (or less concentrated or effective) output 130, whereas increasing consumption of resource 112 results in increased output 130.

As noted in connection with FIG. 1, control component 116 can provide update consumption message 118, which can instruct resource consumption device 108 to modify consumption of resource 112 from previous value 120 to recommended value 114. When set according to recommended value 114 (e.g., recommended by resource provider 104), resource consumption device 108 consumes an amount of resource 112 that results in what is referred to herein as first output 202. Likewise, second output 204 is referred to as output 130 generated when resource consumption device 108 consumes resource 112 at a rate indicated by previous value 120. In some embodiments, system 100 (e.g., flow management component 122) can determine first output 202 and/or second output 204 based on known information or measure the values during operation.

In some embodiments, system 100 (e.g., flow management component 116) can determine changes data 132 as a difference between first output 202 and second output 204.

In other words, change data 132 can represent the difference between output 130 that, after update consumption message 118, will be received by ventilation system 126 and output 130 that was previously received by ventilation system 126.

It is understood that in cases where demand response data 106 is a load up event 206 (e.g., resource provider 104 requests increased consumption), recommended value 114 can be higher than previous value 120 and first output 202 can be higher than second output 204. Conversely, when demand response data 106 is a load shed event 208 (e.g., resource provider 104 requests decreased consumption), recommended value 114 can be lower than previous value 120 and first output 202 can be lower than second output 204. In either case, system 100 can determine change data 132 as first output 202 minus second output 204 or similar. Additional examples of change data 132 are illustrated in connection with FIG. 5.

Figure 3:
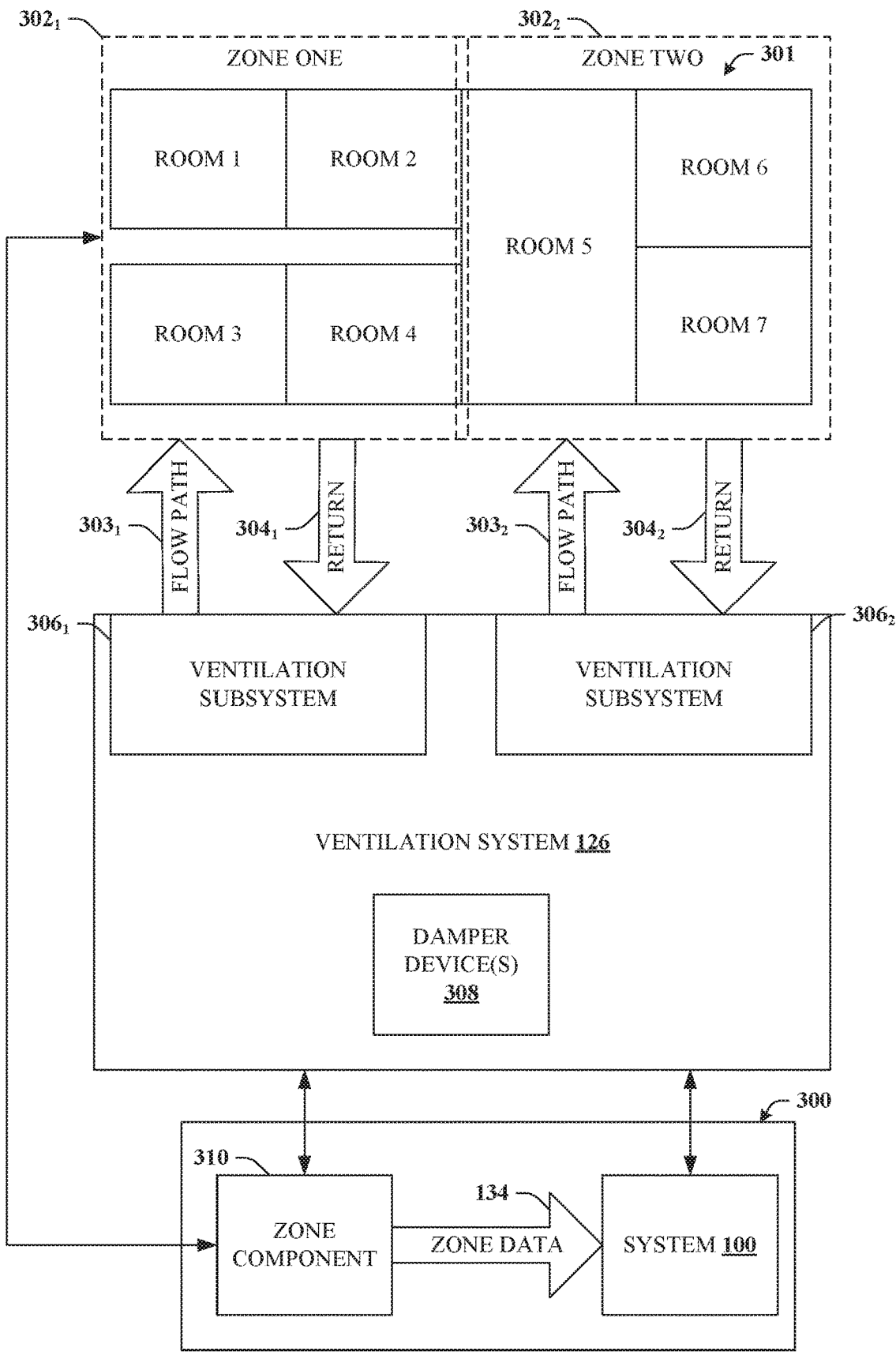
FIG. 3 illustrates a block diagram of an example system illustrating additional aspects or elements in connection with determining or inferring zone data in accordance with one or more embodiments of the disclosed subject matter.

While still referring to FIG. 1, but turning now as well to FIG. 3, a block diagram of system 300 is depicted. System 300 illustrates additional aspects or elements in connection with determining or inferring zone data 134 in accordance with one or more embodiments of the disclosed subject matter. System 300 can include all or a portion of system 100 of FIG. 1 or other suitable components or elements. In addition, system 300 can include zone component 310. Zone component 310 can be configured to determine zone data 134. Recall, zone data 134 can be representative of physical zones of a structure 301 (e.g., home, office, or other building) serviced by HVAC system 110 and/or ventilation system 126.

In this example, structure 301 comprises seven rooms apportioned between two zones 302. Zone one $302_1$ comprises rooms 1-4 and is serviced by ventilation subsystem $306_1$. Zone two $302_2$ comprises rooms 5-7 and is serviced by ventilation subsystem $306_2$. Zones 302 can be configurable to varying degrees of granularity depending on implementation. For instance, in some embodiments, zones 302 can be specified for each portion of structure 301 having a dedicated ventilation subsystem 306 and/or a designated flow path 303 and return 304. Additionally or alternatively, ventilation system 126 can comprise one or more damper device(s) 308. A given damper device 308 can be situated within a duct or pipe of flow path 303 and/or return 304 of ventilation system 126 (or ventilation subsystem 306), and can be configured to open to allow or increase flow or to close to decrease or halt flow. Employing dampers 308 typically can afford finer granularity with respect designating zones 302.

In some embodiments, a zone 302 can represent a single room, while in other embodiments a zone 302 can encompass multiple rooms. In the latter case, it is understood that, in some embodiments, the multiple rooms are not required to be adjacent to one another, but rather can be at opposite ends of structure 301 or any configuration for a given implementation. However, regardless of implementation, zones 302 can be specified by a user (e.g., input to a user interface) or determined by zone component 310 based on a configuration of ventilation system 126, HVAC system 110, and/or structure 301 as well as based on the input specified by the user. In some embodiments, zones 302 can be automatically configured and updated based on time of day and/or in conjunction with a schedule or calendar. This schedule or calendar can be input by the user or determined based on monitoring of occupant routines that can be performed by sensing devices. For example, zones component 310 can configure zones 302 based on room occupancy. In some embodiments, room occupancy can be determined by a sensing device, and such can be employed to establish a routine of the occupants as well as a current occupancy state, which is further detailed in connection with FIG. 4.

Figure 4:
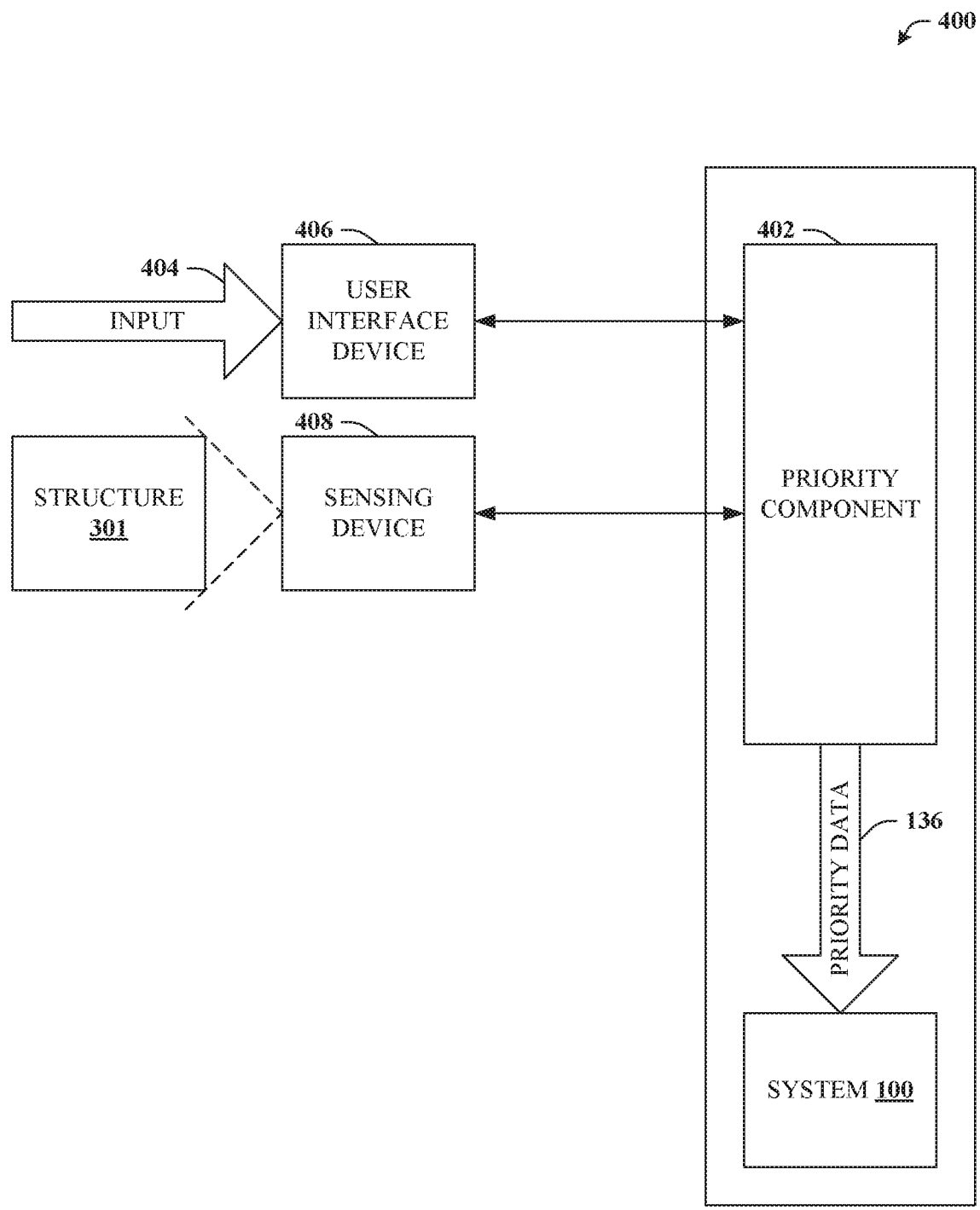
FIG. 4 illustrates a block diagram of an example system depicting additional aspects or elements in connection with determining or inferring priority data in accordance with one or more embodiments of the disclosed subject matter.

Still referring to FIG. 1, but referring now as well to FIG. 4, a block diagram of system 400 is depicted. System 400 illustrates additional aspects or elements in connection with determining or inferring priority data 136 in accordance with one or more embodiments of the disclosed subject matter. System 400 can include all or a portion of system 100 of FIG. 1 or other suitable components or elements. In addition, system 400 can include priority component 402. Priority component 402 can include all or portions of zone component 310 or be integrated with zone component 310. Priority component 402 can be configured to determine or generate priority data 136. As detailed herein, priority data 136 can be representative of priority values assigned to respective physical zones 302 of structure 301.

In some embodiments, priority component 402 can determine priority data 136 in response to an examination of occupancy data. Occupancy data can represent a current or forecasted occupancy state with respect to zones 302. By way of illustration, zones 302 with a current or forecasted high number of occupants can be assigned higher priority, whereas zones 302 with few or no occupants (either current or forecasted) can be assigned lower priority.

In some embodiments, priority component 402 can generate priority data 136 in response to input 404 to user interface device 406. By way of example, input 404 can be an order or hierarchy of zones 302 that is specified by a user or received in some other manner. As another example, input 404 can be a calendar or schedule specified by the user. It is understood that input 404 can be directly provided by a user or may be passively input or determined/inferred based on behavior or activity, either of which may be employed to determine occupancy data.

Additionally or alternatively, priority component 402 can generate priority data 136 and/or occupancy data in response to monitoring of structure 301 by sensing device 408. Sensing device 408 can be, e.g., a motion sensor, a heat sensor, an infrared sensor, an acoustic sensor, or the like. In some embodiments, sensing device 408 can be a location-based sensor that relies on passive or active beacons (e.g., radio frequency identification (RFID)), signal range (e.g., near field communication (NFC) or Bluetooth®), and/or trilateration (e.g., wireless fidelity (Wi-Fi) or global positioning satellite (GPS)) to determine occupancy data. In some embodiments, sensing device 408 can monitor activity associated with other devices within structure 301 to determine occupancy data (e.g., lights and television in a zone 302 are turned on and/or consuming power).

Figure 5:
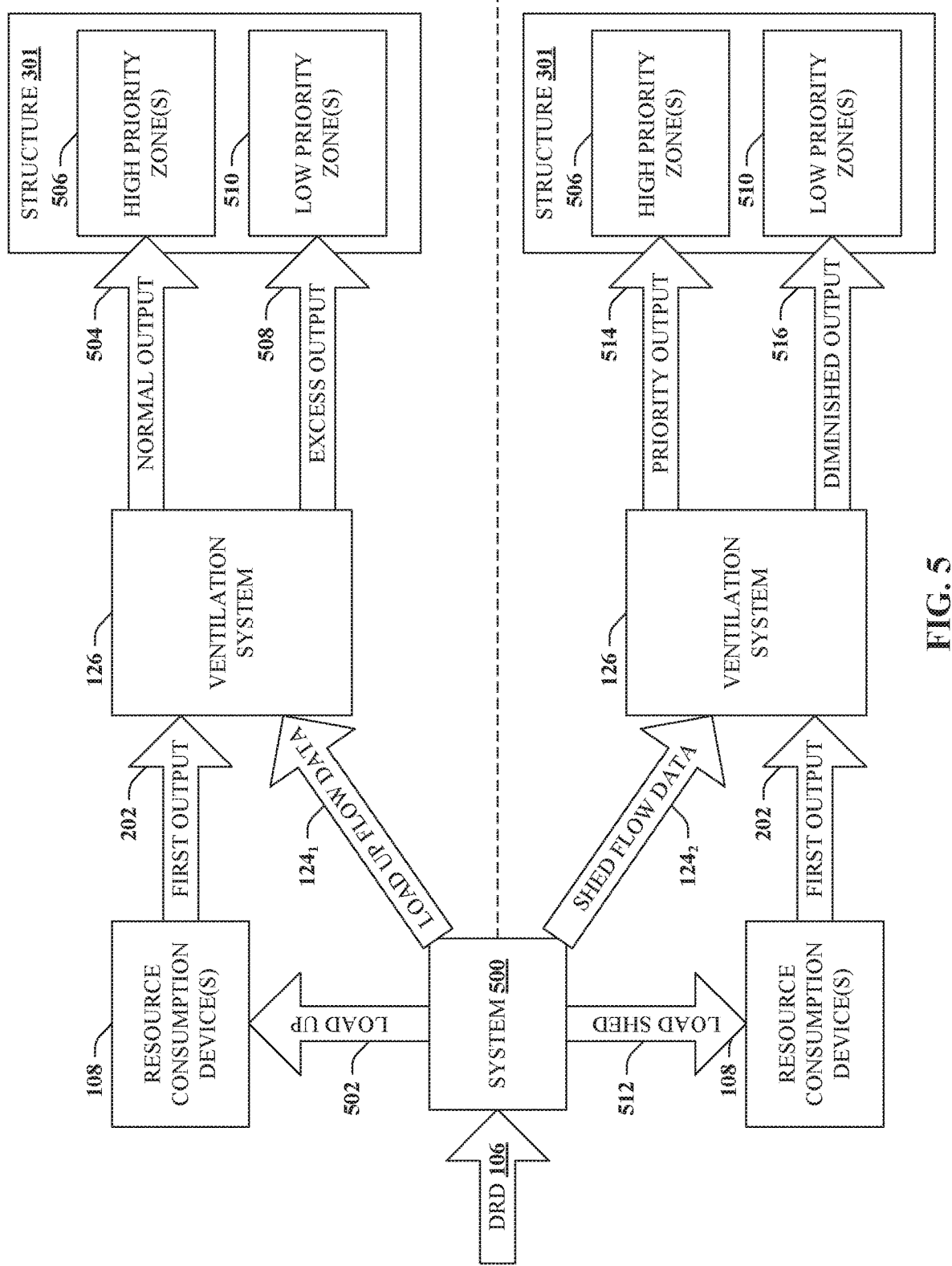
FIG. 5 depicts a block diagram of an example system that illustrates two concrete examples of determining flow data in response to a demand response request in accordance with one or more embodiments of the disclosed subject matter.

With reference now to FIG. 5, a block diagram of system 500 is depicted. System 500 illustrates two concrete examples of determining flow data in response to a demand response request in accordance with one or more embodiments of the disclosed subject matter. In that regard, the upper portion of FIG. 5 illustrates a first example in which demand response data 106 is indicative of a load up event 206. The lower portion of FIG. 5 illustrates a second example in which demand response data 106 is indicative of a load shed event 208. It is understood that system 500 can include all or portions of systems 100, 300, 400, or other components or elements detailed herein.

When resource provider 104 requests system 500 to increase consumption of resource 112 or load up, system 500 (e.g., control component 116) can respond by instructing resource consumption device 108 load up 502. Load up 502 can be a special case of update consumption request 118 in which recommended value 114 is higher than previous value 120. In that case first output 202 can be greater than second output 204 that was being provided by resource consumption device 108 when operating according to previous value 120.

System 500 (e.g., flow management component 122) can further determine flow data 124. In this case, such is represented by load up flow data $124_1$. An advantage of the techniques detailed herein is that ventilation system 126 can distribute first output 202 throughout structure 301 in a non-uniform manner. Leveraging that observation, load up flow data $124_1$ can include two or more independent flow paths or groups of flow paths. In some embodiments, flow management component 122 can determine a flow path for each specified zone 302 of structure 301.

To illustrate further, flow management component 122 can determine one or more normal flow path(s) configured to transport, via ventilation system 126, normal output 504 to a one or more high priority zone(s) 506. High priority zones 506 can be zones 302 that were assigned a high priority value, characterized as being greater than a defined threshold. Normal output 504 can be a suitable portion of first output 202 determined to satisfy a comfort setting criterion and/or a set point criterion of structure 301 or a given high priority zone 506. In other words, high priority zones 506 can get normal treatment (e.g., the same or similar as if no load up event occurred).

Flow management component 122 can further determine one or more excess flow path configured to transport, via ventilation system 126, excess output 506 to a one or more low priority zone(s) 510. Low priority zones 510 can be zones 302 that were assigned a low priority value, characterized as being less than a defined threshold. Excess output 508 can be the remainder of first output 202 not transported to high priority zones 506 (e.g., excess output 508 can equal first output 202 minus normal output 504). In some embodiments, individual portions of excess output 508 can be provided to low priority zones 510 in accordance with priority values (e.g., lower values can receive a larger portion of excess output 508).

When resource provider 104 requests system 500 to decrease consumption of resource 112 or shed load, system 500 (e.g., control component 116) can respond by instructing resource consumption device 108 load shed 512. As with load up 502, load shed 512 can be a special case of update consumption request 118 in which recommended value 114 is lower than previous value 120. In that case first output 202 can be lower than second output 204 that was being provided by resource consumption device 108 when operating according to previous value 120.

System 500 (e.g., flow management component 122) can further determine flow data 124. In this case, such is represented by shed flow data $124_2$. For example, flow management component 122 can determine one or more priority flow path(s) configured to transport, via ventilation system 126, priority output 514 to a one or more high priority zone(s) 506. Given that an objective can be to reduce discomfort for occupants in high priority zones 506, priority output 514 can essentially take priority of all of first output 202.

Priority output 514 can be a suitable portion of first output 202 determined to satisfy a comfort setting criterion and/or a set point criterion of structure 301 or a given high priority zone 506. In other words, high priority zones 506 can get normal treatment (e.g., the same or similar as if no load up event occurred) if there is enough capacity. Thus, if first output 202 is sufficient to satisfy a set point criterion of high priority zones 506, then priority output 514 can be substantially similar to normal output 504. If first output 202 is not sufficient to satisfy a set point criterion of high priority zones 506, then priority output 514 can be equal to first output 202, leaving not remainder to route to low priority zones 510. In some embodiments, priority output 514 can be allocated to individual high priority zones 506 in order of priority values.

In response to first output 202 being determined to be sufficient to satisfy the set point criterion of high priority zones 506, flow management component 122 can further determine one or more diminished flow path(s) configured to transport, via ventilation system 126, diminished output 516 to a one or more low priority zone(s) 510. Diminished output 516 can be the remainder, if any, of first output 202 not transported to high priority zones 506 (e.g., diminished output 516 can equal first output 202 minus priority output 514). In some embodiments, individual portions of diminished output 516 can be provided to low priority zones 510 in accordance with priority values (e.g., lower values can receive a larger portion of diminished output 516).

Figure 6:
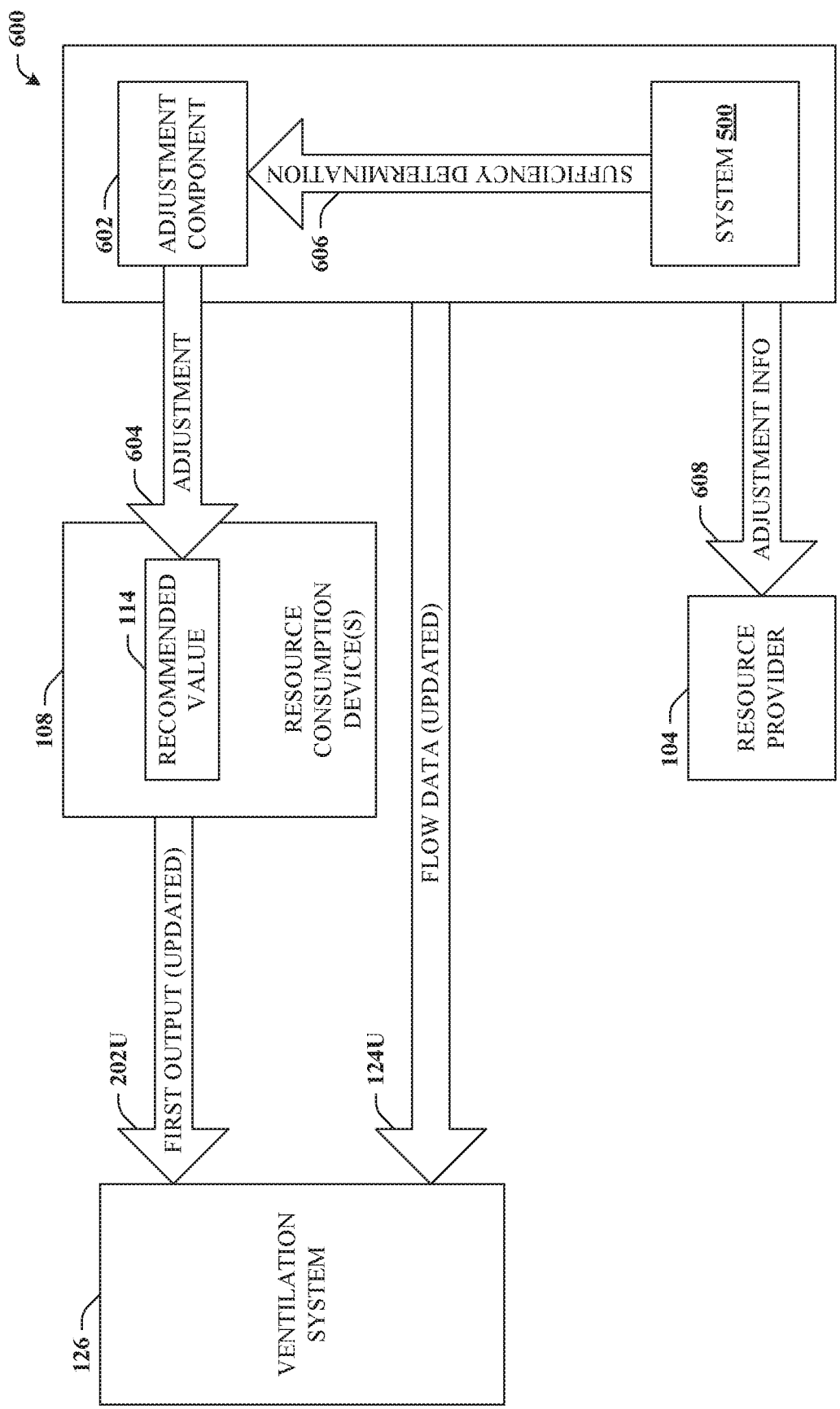
FIG. 6 depicts a block diagram of an example system that illustrates an example of adjusting the recommended value based on a sufficiency determination in accordance with one or more embodiments of the disclosed subject matter.

Turning now to FIG. 6, a block diagram of system 600 is depicted. System 600 illustrates an example of adjusting recommended value 114 based on a sufficiency determination in accordance with one or more embodiments of the disclosed subject matter. System 600 can include all or portions of system 500, or other components or elements detailed herein.

In addition, system 600 can include adjustment component 602. Adjustment component 602 can be configured to determine adjustment 604. Adjustment 604 can represent an adjustment to recommended value 114 based on whether first output 202 is determined to be sufficient to satisfy the set point criterion of the high priority zones 506. Such a determination can be performed by system 500, and is depicted as sufficiency determination 606.

In some embodiments, sufficiency determination 606 can include an indication of whether first output 202 is sufficient. To give an example, consider the case in which resource provider 104 requests a load shed. If sufficiency determination 606 indicates first output 202 is insufficient to maintain a defined comfort level in the high priority zones, then satisfying the request of the resource provider 104 may result in discomfort for occupants in high priority zones.

In response, adjustment 604 can modify recommended value 114 by an amount that is determined to be threshold sufficient for an updated first output 202U to be sufficient to satisfy the defined comfort level (e.g., a set point criterion) of high priority zones 506. For example, suppose resource provider requests that consumption of resource 112 be reduced by 65%, while it is determined that reducing consumption of resource 112 by any more than 50% will result in a first output 202 that cannot fully satisfy the defined comfort level. In that case, 50% can represent the threshold to be threshold sufficient for updated first output 202U to satisfy the defined comfort level. Hence, adjustment component 602 can change the recommended value 114 from a value indicative of the 65% reduction requested by resource provider 104 to a value indicative of the threshold sufficiency (e.g., 50% of capacity). In this case, the request of resource provider 104 is not fully met, but a substantial contribution was made, which may be nearly as helpful to resource provider 104. In fact, the resource provider might prefer taking a 50% reduction over the requested 65% reduction if the customer's comfort is more likely to be satisfied because such can go a long way to encourage comfort-oriented customers to enroll in demand response programs. It is appreciated that, in some embodiments, system 500 can estimate sufficiency determination 606 in response to receiving the request to reduce consumption of resource 112 by 65% in advance of updating recommended value 114.

On the other hand, if first output 202 is determined to be sufficient, then sufficiency determination 606 can indicate whether first output 202 is more than sufficient. For example, suppose a reverse of the above scenario, one where resource provider 104 requests a reduction of 50%, while system 500 determines that resource consumption device 108 can reduce consumption of resource 112 by 65% and still sustain the comfort level of high priority zones 506. In that case, adjustment 604 can adjust recommended value 114 by an amount that is determined to be threshold sufficient for updated first output 202U to satisfy the comfort level. In other words, adjustment 604 can facilitate reducing consumption by 65%, since a 50% change (requested by resource provider 104) left a remainder (e.g., nonzero diminished output 516) to be distributed to low priority zones 510, which is not strictly necessary.

Determining that first output is more than sufficient can also be useful in the context of a load up event 206. For example, even though resource provider 104 requests, e.g., a 50% increase in capacity, adjustment component 602 can increase that recommendation to 65% (or 100%) to consume more of the resource. Recall, excess output 508 can be routed to low priority zones 510, without substantially affecting high priority zones 506 or comfort levels of occupants therein.

Figure 7A:
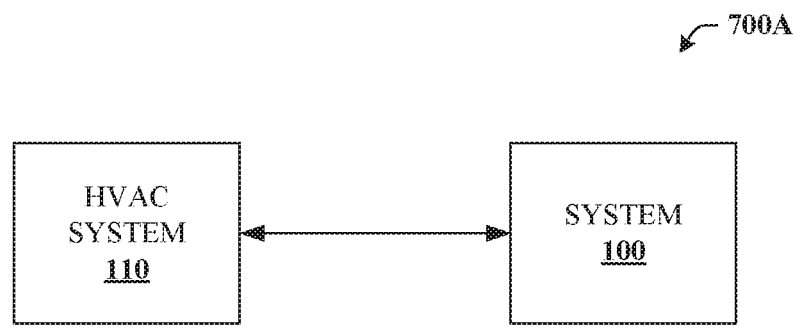
FIGS. 7A-B illustrate block diagrams of example architectural implementations that can be employed in accordance with one or more embodiments of the disclosed subject matter.
Figure 7B:
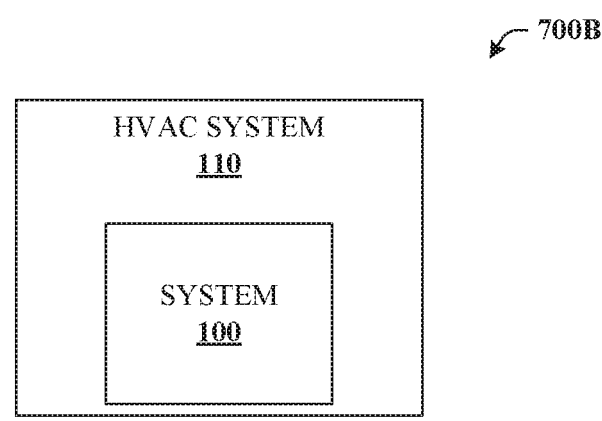

Turning now to FIGS. 7A-B, various block diagrams 700A-B of example architectural implementations are illustrated in accordance with one or more embodiments of the disclosed subject matter.

For example, block diagram 700A depicts an example architectural design in which all or portions of system 100 (or other components detailed herein) are remote from HVAC system 110. For example, all or portions of system 100, 500, etc., can be implemented on a computing device (e.g., general purpose or special purpose HVAC interface equipment, a PC, laptop, tablet, phone, etc.). Additionally or alternatively, block diagram 700B depicts an example architectural design in which all or portions of system 100 (or other components detailed herein) are include in or operatively coupled to HVAC system 110.

Example Methods

Figure 8:
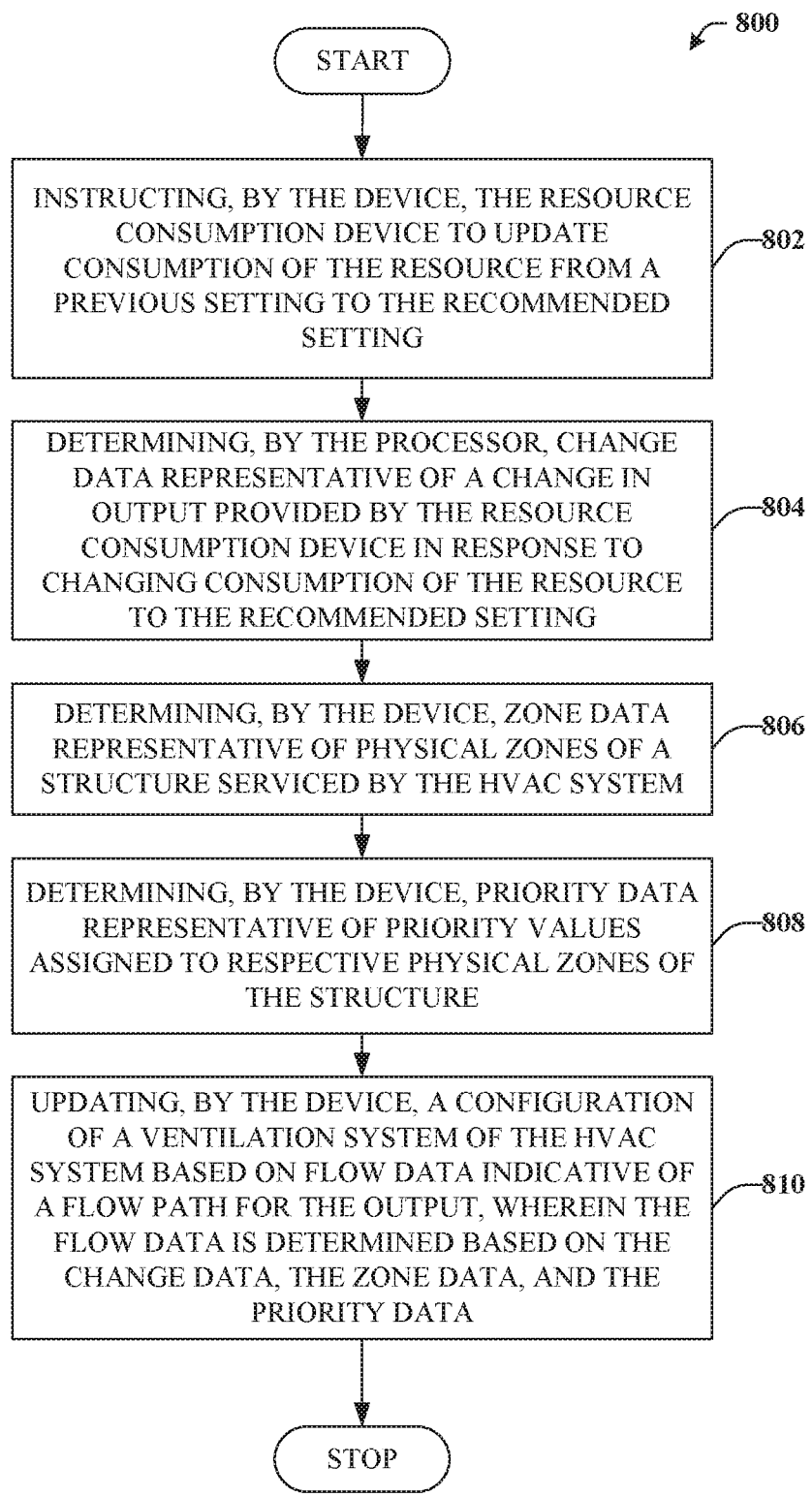
FIG. 8 illustrates a flow diagram of an example, non-limiting computer-implemented method that can determine a flow path of resource consumption device output that reduces discomfort of occupants in response to a demand response request from a resource provider in accordance with one or more embodiments of the disclosed subject matter.
Figure 9:
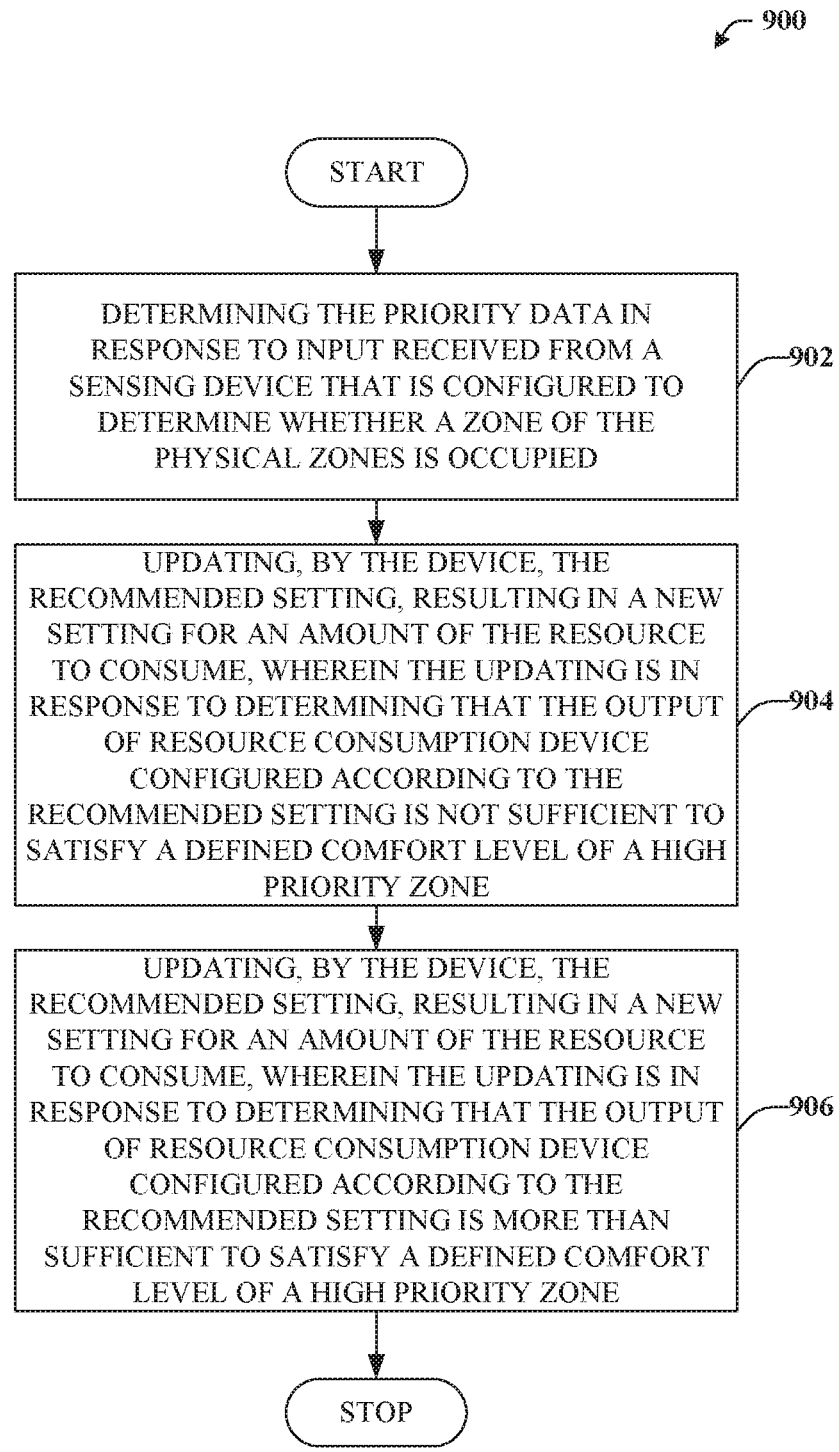
FIG. 9 illustrates a flow diagram of an example, non-limiting computer-implemented method that can provide for additional aspects or elements in connection with determining the flow path of resource consumption device output in accordance with one or more embodiments of the disclosed subject matter.

FIGS. 8 and 9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 8 illustrates a flow diagram 800 of an example, non-limiting computer-implemented method that can determine a flow path of resource consumption device output that reduces discomfort of occupants in response to a demand response request from a resource provider in accordance with one or more embodiments of the disclosed subject matter. For example, at reference numeral 802, a device (e.g., system 100, system 500) operatively coupled to a processor can receive demand response data comprising a request that a resource consumption device of an HVAC system modify consumption of a resource according to a recommended setting requested by a resource provider entity. In some embodiments, the resource provider entity can request an increase in consumption of the resource (e.g., a load up event). In some embodiments, the request can be a request to decrease consumption of the resource (e.g., a load shed event).

At reference numeral 804, the device can instruct the resource consumption device to update consumption of the resource from a previous setting to the recommended setting. In response to the update changing from the previous setting to the recommended setting, an output or estimated output of the resource consumption device can change as well.

At reference numeral 806, the device can determine change data representative of a change in output provided by the resource consumption device in response to changing consumption of the resource to the recommended setting. At reference numeral 808, the device can determine zone data representative of physical zones of a structure serviced by the HVAC system. At reference numeral 810, the device can determine priority data representative of priority values assigned to respective physical zones of the structure.

At reference numeral 810, the device can update a configuration of a ventilation system of the HVAC system based on flow data indicative of a flow path for the output, wherein the flow data is determined based on the change data, the zone data, and the priority data.

Turning now to FIG. 9, illustrated is a flow diagram 900 of an example, non-limiting computer-implemented method that can provide for additional aspects or elements in connection with determining the flow path of resource consumption device output in accordance with one or more embodiments of the disclosed subject matter. For example, at reference numeral 902, the determining the priority (e.g., performed at reference numeral 808 of FIG. 8) can comprise determining the priority data in response to input received from a sensing device that is configured to determine whether a zone of the physical zones is occupied. For example, occupancy sensors of a suitable type can provide information, which can be employed to assign priority to zones. In that regard, zones with no occupants can be assigned low priority and zones with occupants can be assigned a high priority.

At reference numeral 904, the device update recommended setting, resulting in a new setting for an amount of the resource to consume, wherein the updating is in response to various determinations. For example, the updating can be in response to a first determination that the output of resource consumption device configured according to the recommended setting is not sufficient to satisfy a defined comfort level of a high priority zone. Additionally or alternatively, the update can be in response to a second determination that the new setting will result in the output being sufficient to satisfy the defined comfort level of the high priority zone.

At reference numeral 906, the device can update recommended setting, resulting in a new setting for an amount of the resource to consume, wherein the updating is in response to other determinations. For instance, the updating can be in response to a third determination that the output of resource consumption device configured according to the recommended setting is more than sufficient to satisfy a defined comfort level of a high priority zone. Additionally or alternatively, the update can be in response to a fourth determination that the new setting will result in a greater contribution toward meeting an objective of the resource provider entity.

Example Operating Environments

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
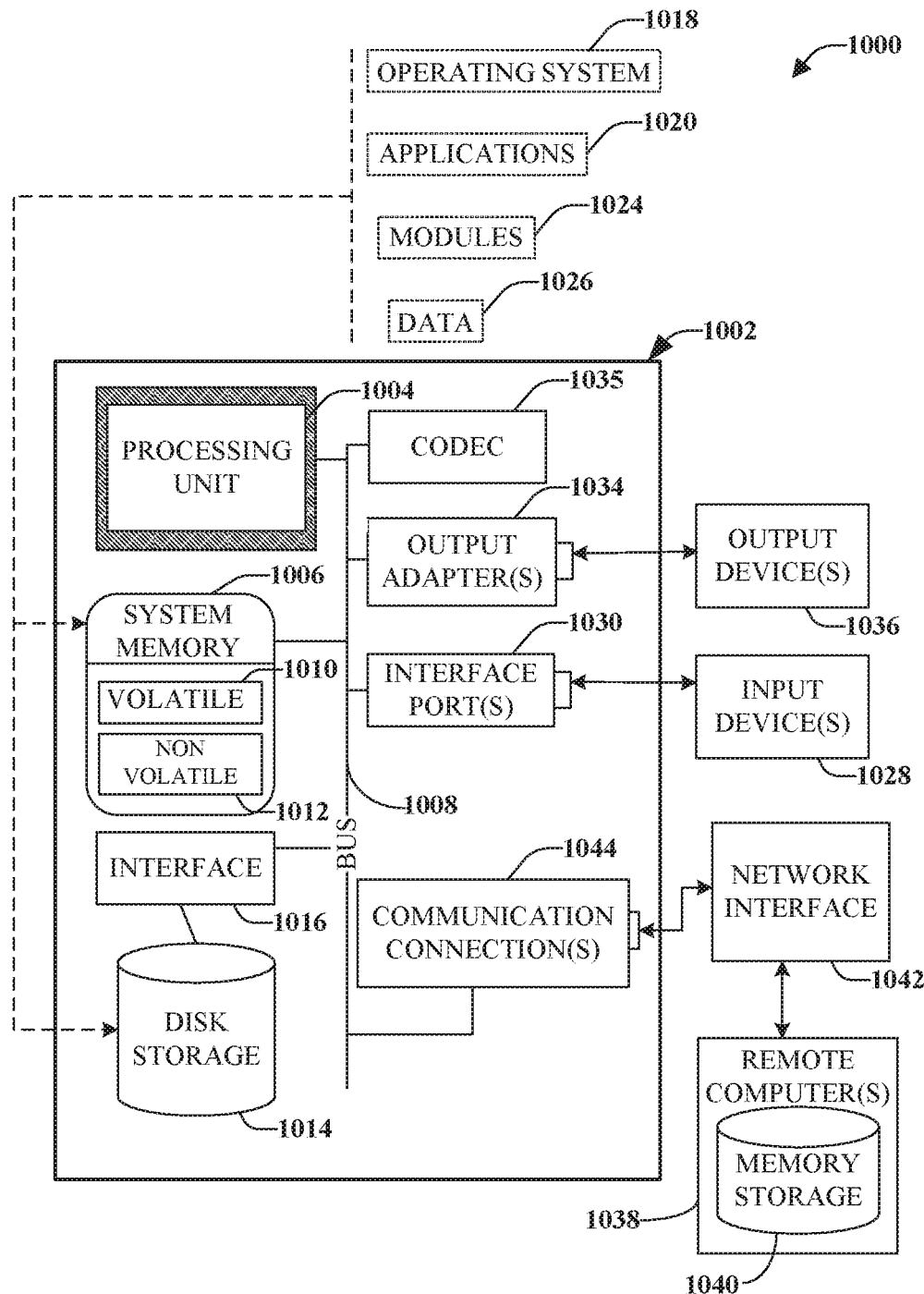
FIG. 10 illustrates a block diagram of an example, non-limiting operating environment in which one or more embodiments described herein can be facilitated.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) (1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, or game pad; a satellite dish, a scanner, a TV tuner card, a digital camera, a digital video camera, a web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor;
   a memory that stores instructions;
   the instructions being executable by the processor to:
   receive, from a resource provider, demand response data comprising a request that a resource consumption device of a heating, ventilation, or air conditioning (HVAC) system modify consumption of a resource according to a recommended value;
   instruct the resource consumption device to update consumption of the resource from a previous value to the recommended value;
   determine flow data indicative of a flow path of a ventilation system of the HVAC system, wherein the flow path is determined as a function of: change data representative of a change in output provided by the resource consumption device in response to changing consumption of the resource to the recommended value; zone data representative of physical zones of a structure serviced by the HVAC system; and priority data representative of priority values assigned to respective physical zones of the structure; wherein the change data is representative of a difference between a first output and a second output, wherein the first output is representative of the output provided by the resource consumption device when consuming the resource according to the recommended value, and wherein the second output is representative of the output provided by the resource consumption device when consuming the resource according to the previous value;
   determine a normal flow path configured to transport, via the ventilation system, a normal output to a first group of the physical zones that were assigned a priority value that is greater than a defined threshold, wherein the normal output is determined to satisfy a set point criterion of the first group;
   determine an excess flow path configured to transport, via the ventilation system, an excess output to a second group of the physical zones that were assigned a priority value that is less than the defined threshold, wherein the excess output is representative of a difference between the first output and the normal output;
   update a configuration of a ventilation system of the HVAC system based on the normal flow path and/or the excess flow path.

2. The system of claim 1, wherein the demand response data is indicative of a load up event characterized by the request indicating the resource consumption device is to increase consumption of the resource.

3. The system of claim 1, wherein the demand response data is indicative of a load shed event characterized by the request indicating the resource consumption device is to decrease consumption of the resource.

4. The system of claim 3, wherein the instructions further cause the processor to determine a priority flow path configured to transport, via the ventilation system, a priority output to a first group of the physical zones that were assigned a priority value that is greater than a defined threshold, and wherein: the priority output is a sufficient portion of the first output that is determined to be sufficient to satisfy a set point criterion of the first group; or the priority output equals the first output in response to the first output being insufficient to satisfy a set point criterion of the first group.

5. The system of claim 4, wherein: in response to the first output being determined to be sufficient to satisfy the set point criterion of the first group, the processor determines a diminished flow path configured to transport, via the ventilation system, diminished output to a second group of the physical zones that were assigned a priority value that is less than the defined threshold, wherein the diminished output is representative of a difference between the first output and the priority output or in response to the first output being determined to be insufficient to satisfy the set point criterion of the first group, the processor configures the priority flow to satisfy the set point criterion of individual zones of the first group according to respective priority values.

6. The system of claim 4, further comprising an adjustment component configured to adjust the recommended value based on whether the first output is determined to be sufficient to satisfy the set point criterion of the first group.

7. The system of claim 6, wherein:

in response to the first output being determined to be insufficient to satisfy the set point criterion of the first group, the adjustment component adjusts the recommended value by an amount that is determined to be threshold sufficient for the first output to satisfy the set point criterion of the first group; or in response to the first output being determined to be more than sufficient to satisfy the set point criterion of the first group, the adjustment component adjusts the recommended value by an amount that is determined to be threshold sufficient for the first output to satisfy the set point criterion of the first group.

8. The system of claim 1, further comprising a priority component configured to generate the priority data.

9. The system of claim 8, wherein:
the priority component generates the priority data in response to input to a user interface device; or
the priority component generates the priority data in response to occupancy data determined in response to a signal generated by a sensing device configured to detect presence of occupants of the structure.

10. The system of claim 1, wherein the processor effectuates the flow path in response to: transmitting a second instruction to a subsystem of the HVAC system to modify operation of the of the subsystem in accordance with the flow data; or transmitting a first instruction to a damper device situated in the ventilation system, wherein the first instruction instructs the damper device to change state in accordance with the flow data.

11. A non-transitory computer-readable medium, comprising executable instructions that, when executed by a processor, facilitate performance of operations, comprising:
receiving demand response data comprising a request that a resource consumption device of a heating, ventilation, or air conditioning (HVAC) system modify consumption of a resource according to a recommended value;
instructing the resource consumption device to update consumption of the resource from a previous value to the recommended value;
determining change data representative of a change in output provided by the resource consumption device in response to changing consumption of the resource to the recommended value; wherein the change data is representative of a difference between a first output and a second output, wherein the first output is representative of the output provided by the resource consumption device when consuming the resource according to the recommended value, and wherein the second output is representative of the output provided by the resource consumption device when consuming the resource according to the previous value;
determining zone data representative of physical zones of a structure serviced by the HVAC system; determining priority data representative of priority values assigned to respective physical zones of the structure;
determining a normal flow path configured to transport, via the ventilation system, a normal output to a first group of the physical zones that were assigned a priority value that is greater than a defined threshold, wherein the normal output is determined to satisfy a set point criterion of the first group;
determining an excess flow path configured to transport, via the ventilation system, an excess output to a second group of the physical zones that were assigned a priority value that is less than the defined threshold, wherein the excess output is representative of a difference between the first output and the normal output; and
updating a configuration of a ventilation system of the HVAC system based on the normal flow path and/or the excess flow path.

12. A method, comprising:
receiving, by a device comprising a processor, demand response data comprising a request that a resource consumption device of a heating, ventilation, or air conditioning (HVAC) system modify consumption of a resource according to a recommended setting requested by a resource provider entity;
instructing, by the device, the resource consumption device to update consumption of the resource from a previous setting to the recommended setting;
determining, by the processor, change data representative of a change in output provided by the resource consumption device in response to changing consumption of the resource to the recommended setting; wherein the change data is representative of a difference between a first output and a second output, wherein the first output is representative of the output provided by the resource consumption device when consuming the resource according to the recommended value, and wherein the second output is representative of the output provided by the resource consumption device when consuming the resource according to the previous value;
determining, by the device, zone data representative of physical zones of a structure serviced by the HVAC system;
determining, by the device, priority data representative of priority values assigned to respective physical zones of the structure;
determining a normal flow path configured to transport, via the ventilation system, a normal output to a first group of the physical zones that were assigned a priority value that is greater than a defined threshold, wherein the normal output is determined to satisfy a set point criterion of the first group;
determining an excess flow path configured to transport, via the ventilation system, an excess output to a second group of the physical zones that were assigned a priority value that is less than the defined threshold, wherein the excess output is representative of a difference between the first output and the normal output; and
updating, by the device, a configuration of a ventilation system of the HVAC system based on the normal flow path and/or the excess flow path.

* * * * *